(12) United States Patent
Singhal et al.

(10) Patent No.: US 7,542,876 B2
(45) Date of Patent: Jun. 2, 2009

(54) METHOD OF AND APPARATUS FOR EVALUATING THE PERFORMANCE OF A CONTROL SYSTEM

(75) Inventors: Ashish Singhal, Glendale, WI (US); Timothy I. Salsbury, Whitefish Bay, WI (US)

(73) Assignee: Johnson Controls Technology Company, Holland, MI (US)

( * ) Notice: Subject to any disclaimer, the term of this patent is extended or adjusted under 35 U.S.C. 154(b) by 953 days.

(21) Appl. No.: 10/876,854

(22) Filed: Jun. 25, 2004

(65) Prior Publication Data

US 2005/0284160 A1    Dec. 29, 2005

(51) Int. Cl.
*G06F 11/30* (2006.01)
*G06F 11/00* (2006.01)

(52) U.S. Cl. .............. 702/185; 702/188; 702/190; 702/193; 701/9

(58) Field of Classification Search ............. 702/66, 702/67, 87, 180–191, 113, 75, 68; 701/9, 701/10; 700/9, 10, 26
See application file for complete search history.

(56) References Cited

U.S. PATENT DOCUMENTS

| 5,719,788 A | * | 2/1998 | Seborg et al. ............... 702/179 |
| 7,289,936 B2 | * | 10/2007 | Singhal et al. ............. 702/182 |
| 2004/0078168 A1 | | 4/2004 | Horch |

OTHER PUBLICATIONS

Armstrong-Hélouvry, B., DuPont, P. and Canudas de Wit, C. (1994), "A Survey of Models, Analysis Tools and Compensation Methods for the Control of Machines With Friction", *Automatica*, 30, (pp. 1083-1138).

Bialkowski, W. L. (1992), "Dreams vs. Reality: A View From Both Sides Of The Gap", *Control Systems '92 Conference*. Whistler, BC, Canada, (pp. 283-295).

Brockwell, Peter J. and Davis, Richard A. (2002), *Introduction to Time Series and Forecasting*, 2nd edition, Springer, NY, (pp. 139-140).

Choudhury, M.A.A.S., Shah, S.L. and Thornhill, N. F. (2004a), "Diagnosis of Poor Control Loop Performance using Higher Order Statistics", *Automatica* (to appear in Jun. 2004), (pp. 1-14).

(Continued)

*Primary Examiner*—Eliseo Ramos Feliciano
*Assistant Examiner*—Phuong Huynh
(74) *Attorney, Agent, or Firm*—Foley & Lardner LLP (57) ABSTRACT

A method of and apparatus for evaluating the performance of a control system are disclosed. The method of evaluating the performance of a control system includes calculating a ratio of a first area associated with the signal and a second area associated with the signal. The method also includes comparing the ratio with a predetermined value and determining a cause of an oscillation in the control system based on the comparison. The apparatus for evaluating the performance of a control system includes a processor operable to execute a first function configured to calculate a ratio of a first area associated with the signal and a second area associated with the signal. The first function is also configured to compare the ratio with a predetermined value and determine a cause of oscillation in the control system based on the comparison.

35 Claims, 5 Drawing Sheets

OTHER PUBLICATIONS

Choudhury, M.A.A.S., Thornhill, N.F. and Shah, S.L. (2004b), "A Data-Driven Model For Valve Stiction", In *Proc. IFAC ADCHEM 2003*, Hong Kong, (6 pgs).

Desborough, L., Nordh, P. and Miller, R. (2001), "Control System Reliability: Process Out Of Control", *Industrial Computing*, (August), (pp. 52-55), http://www.loopscout.com/Info/Intech.pdf.

Forsman, K., Stattin, A. (1999), "A new criterion for detecting oscillations in control loops", Proceedings of European Control Conference. Karlsruhe, Germany. CP8-3, (4 pgs).

Gerry, J. and Ruel, M. (2001), "How To Measure And Combat Valve Stiction On Line", In *Proc. ISA 2001. Houston, TX: Instrumentation, Systems and Automated Society*, 4 pgs.).

Horch, A., (1999), "A simple method for detection of stiction in control valves", *Control Eng. Practice*, 7, (pp. 1221-1231).

Horch, A., (2000), "Condition Monitoring of Control Loops", Ph.D. dissertation, Royal Institute of Technology, Stockholm, Sweden. http://www.lib.kth.se/Fulltext/horch001204.pdf., (216 total pgs.).

Horch, A. and Isaksson, A. J., (1998), "A Method For Detection Of Stiction In Control Valves", In *Proc. IFAC Workshop on On-line Fault Detection and Supervision in Chemical Process Industry*, Lyon, France, session 4B, (6 pgs).

Kedem, B., (1994), *Time Series Analysis by Higher Order Crossings*, IEEE Press, NY, (pp. 1477-1493).

Miao, T. and Seborg, D. E., (1999), "Automatic Detection of Excessively Oscillatory Feedback Control Loops", Proceedings of the 1999 IEEE International Conference on Control Applications. Hawaii, USA, (pp. 359-364).

Ruel, M., (2000), "Stiction: The Hidden Menace", *Control Magazine*, 13 (11), (pp. 1-11), http://www.expertune.com/articles/RuelNov2000/stiction.html.

Ruel, M., (2002), "Valve Diagnosis Identifies Process Problems", In *Proc. ISA Western Regional Conf. and Exhibition*, Las Vegas, NV, http://www.topcontrol.com/en/papers.htm., (10 pgs.).

Stenman, A., Gustafsson, F. and Forsman, K., (2003), "A segmentation-based method for detection of stiction in control valves", *Intl. J. Adaptive Control & Signal Processing*, 17, (pp. 625-634).

Thornhill, N. F. and Hägglund, T., (1997), "Detection And Diagnosis Of Oscillations In Control Loops", *Control Engr. Practice*, 5, (pp. 1343-1354).

\* cited by examiner

METHOD OF AND APPARATUS FOR EVALUATING THE PERFORMANCE OF A CONTROL SYSTEM

BACKGROUND

The present description relates generally to methods of and apparatuses for evaluating the performance of a control system. More specifically, the present description relates to automated methods of and apparatuses for detecting and diagnosing oscillations in a feedback control loop.

Oscillating feedback control loops are a common occurrence in many types of control systems, such as heating, ventilating, and air conditioning (HVAC) systems. Oscillations are typically the result of periodic changes that cause a signal within a feedback control loop to vary undesirably in a deterministic and repeatable fashion. Oscillating loops are undesirable because they increase variability in the quality of control and product performance, accelerate equipment wear, and may cause further oscillations in other interacting loops. Thus, detection, diagnosis, and correction of oscillations are important activities in feedback control loop supervision and maintenance.

Common causes of oscillations in feedback control loops include external oscillating disturbances, bad controller tuning, nonlinearities in a system component, such as static and dynamic nonlinearities, stiction (i.e., a sticking valve), incorrect component sizing, and poor actuator resolution, or a combination of these causes. Causes such as static and dynamic nonlinearities, stiction, incorrect component sizing, and poor actuator resolution are classified as system problems. External oscillating disturbances and bad controller tuning are classified as control problems.

Oscillation diagnosis involves distinguishing between these different causes of oscillations once they have been detected. Distinguishing between these types of causes is important for identifying the appropriate remedial action. For example, attempts at re-tuning a controller will be unsuccessful or inefficient where a system problem is the cause of the oscillations rather than a control problem.

One problem with existing methods of detecting oscillations is that they require prior specification of an expected time parameter for the feedback control loop. Usually the information is required to configure a noise filter, or to set detection thresholds. This information is often unavailable or cannot be reliably estimated. Further, existing methods of diagnosing oscillations typically require a manual visual inspection of the shape of several different signals in the oscillating feedback control loop in order to distinguish between control problems and system problems. These requirements increase the required effort and costs associated with implementing the diagnosis method.

Thus, there is need for a method of and apparatus for evaluating the performance of a control system which does not require prior information about the feedback control loop being monitored. There is also need for a method of and apparatus for evaluating the performance of a control system that does not require monitoring shapes of multiple signals in the feedback control loop. There is further need for a method of and apparatus for evaluating the performance of a control system that is automated such that it does not require a manual visual inspection of a signal to distinguish among different causes of oscillations. There is yet further need for a method of and apparatus for evaluating the performance of a control system that is intuitive, easily implemented either directly or remotely, and requires minimal computational effort.

SUMMARY

According to an exemplary embodiment, a method of evaluating the performance of a control system includes calculating a ratio of a first area associated with the signal and a second area associated with the signal. The method also includes comparing the ratio with a predetermined value and determining a cause of an oscillation in the control system based on the comparison.

According to another exemplary embodiment, an apparatus for evaluating the performance of a control system includes a processor operable to execute a first function configured to calculate a ratio of a first area associated with the signal and a second area associated with the signal. The first function is also configured to compare the ratio with a predetermined value and determine a cause of an oscillation in the control system based on the comparison.

According to another exemplary embodiment, an apparatus for evaluating the performance of a control system includes means for calculating a ratio of a first area associated with a signal from the control system and a second area associated with the signal, means for comparing the ratio with a predetermined value, and means for determining a cause of an oscillation in the control system based on the comparison.

According to another exemplary embodiment, a method of evaluating the performance of a control system includes detecting an oscillation in the control system. The method also includes calculating a ratio of a first area associated with a signal from the control system and a second area associated with the signal, comparing the ratio with a predetermined value, and determining a cause of an oscillation in the control system based on the comparison.

According to another exemplary embodiment, an apparatus for evaluating the performance of a control system includes a processor operable to execute a first function and a second function, wherein the first function is configured to perform the steps of calculating a ratio of a first area associated with the signal from the control system and a second area associated with the signal, comparing the ratio with a predetermined value, and determining a cause of an oscillation in the control system based on the comparison. The second function is configured to perform the step of detecting an oscillation in the control system.

According to another exemplary embodiment, a method of evaluating the performance of a control system includes determining an autocorrelation from a signal from the controller, filtering the signal based on the autocorrelation, generating an autoregressive moving average (ARMA) model of the filtered signal, calculating a performance index value for the control system based on the model, and determining whether an oscillation is present in the control system based on the performance index value.

According to another exemplary embodiment, an apparatus for evaluating the performance of a control system includes a processor operable to execute a first function. The first function is configured to perform the steps of determining an autocorrelation from a signal from the controller, filtering the signal based on the autocorrelation, and generating an autoregressive moving average (ARMA) model of the filtered signal. The first function is further configured to perform the steps of calculating a performance index value for the control system based on the model and determining whether an oscillation is present in the control system based on the performance index value.

Other features and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and.

DETAILED DESCRIPTION

In the following description, for the purposes of explanation, numerous details are set forth in order to provide a thorough understanding of the present invention. It will be evident to one skilled in the art, however, that the exemplary embodiments may be practiced without these specific details. In other instances, structures and device are shown in diagram form in order to facilitate description of the exemplary embodiments. Furthermore, while the exemplary embodiments are often described in the context of an HVAC control system utilizing proportional plus integral (PI) action controllers, it should be understood that the disclosed method of and apparatus for evaluating the performance of a control system may be used in any of a variety of control systems and control methodologies.

Figure 1:
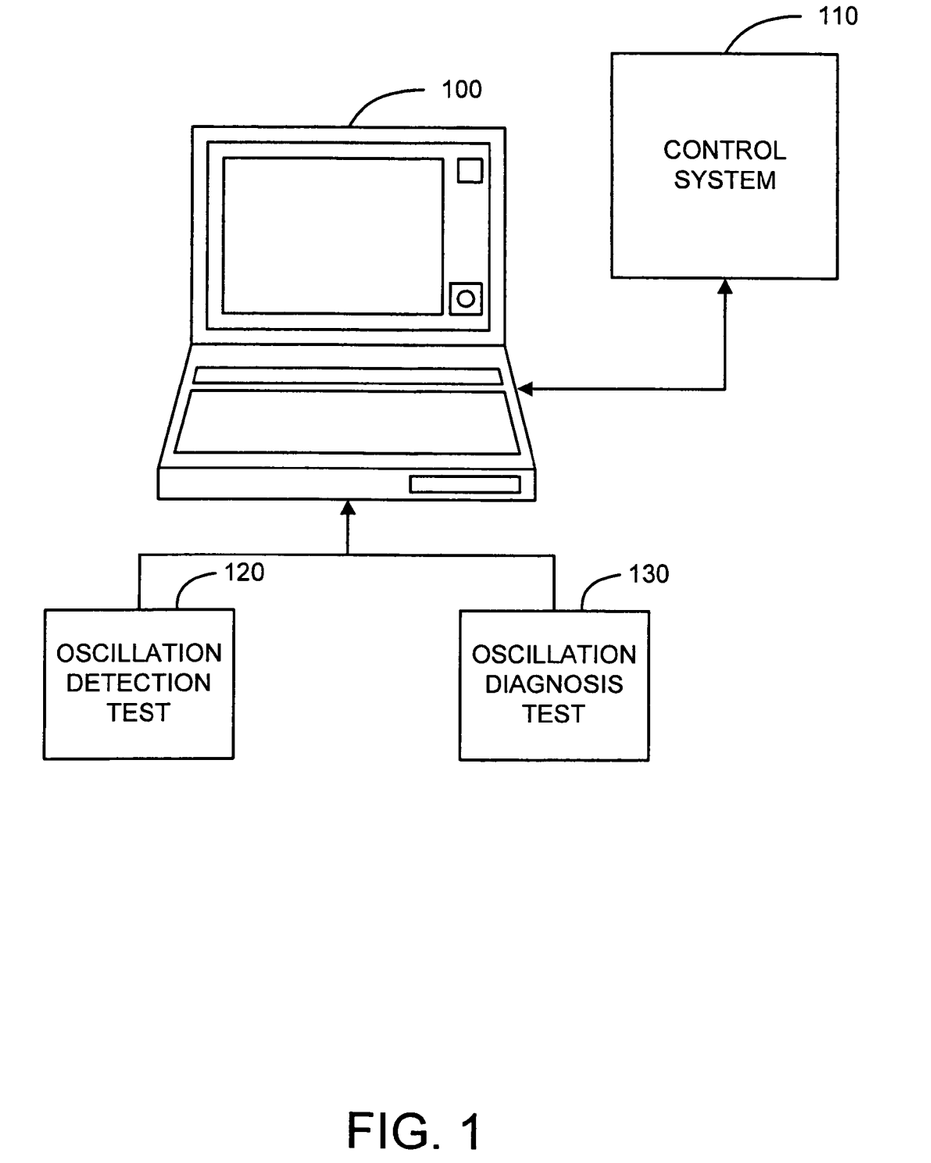
FIG. 1 is a diagram which illustrates an apparatus for evaluating the performance of a control system according to an exemplary embodiment.

FIG. 1 illustrates a testing tool 100 for evaluating the performance of a control system 110 according to an exemplary embodiment. Testing tool 100 includes an oscillation detection function 120 and an oscillation diagnosis function 130. While testing tool 100 is illustrated in FIG. 1 as including both oscillation detection function 120 and oscillation diagnosis function 130, it should be understood that many other configurations are possible. For example, according to other embodiments, testing tool 100 optionally excludes either oscillation detection function 120 or oscillation diagnosis function 130. According to yet other embodiments, oscillation detection function 120 and oscillation diagnosis function 130 are combined as a single function. Testing tool 100 may generally be used to evaluate the performance of control system 110. More specifically, testing tool 100 may be used to detect and diagnose oscillations in a control loop, such as a control loop in an HVAC system.

Testing tool 100 may be implemented as any general purpose computing device, such as a microprocessor device with sufficient memory and processing capability. An exemplary device may include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer. Testing tool 100 may be implemented on, for example, a desktop or other computer (e.g., a stand-alone system or a networked system of computers), or on a portable device (e.g., laptop computer, personal digital assistant (PDA), etc.). For example, in the illustrated embodiment, testing tool 100 is implemented on a laptop computer which may be made available to field service personnel. According to another exemplary embodiment, testing tool 100 is integrated into a device, such as a controller, within control system 110.

Testing tool 100, in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Testing tool 100 may also be implemented in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Testing tool 100, in other embodiments, may be implemented as software or a web application. Software and web implementations may be accomplished with standard programming techniques with rule based logic and other logic to accomplish the various database searching steps, correlation steps, comparison steps and decision steps. It should also be noted that software and web implementations may include implementations using one or more lines of software code, and/or hardware implementations, and/or equipment for receiving manual inputs.

Testing tool 100 is configured to be coupled (e.g., communicatively coupled) to control system 110 such that data may be exchanged (e.g., control signal data, etc.) between testing tool 100 and control system 110. Such coupling may be direct or remote. For example, according to an exemplary embodiment, testing tool 100 is remotely coupled to control system 110 via an external network connection (e.g., internet, intranet, Ethernet, etc.) or the like. According to another embodiment, testing tool 100 is directly coupled to control system 110 via a suitable connection port or terminal on a controller or device within control system 110. Testing tool 100 may be coupled to control system 110 using any suitable connection type or method, such as a wireless connection, a detachable communication cable, a "hard-wired" or other electrical or electronic connection, and the like.

Control system 110 may be a control system, such as an HVAC system, which may include one or more industrial controllers utilizing any of a variety of control methodologies. For example, in one embodiment the control methodology may be a proportional plus integral (PI) methodology, and control system 110 may include one or more digital PI controllers operating in discrete time which implement one or more feedback control loops. In other embodiments, control system 110 may include other types of control systems and methodologies.

Figure 2:
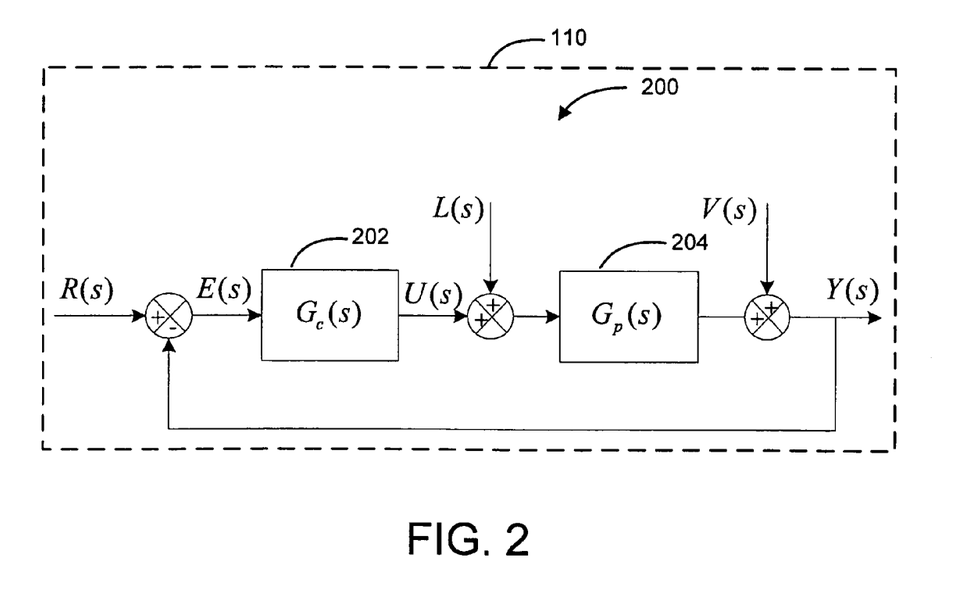
FIG. 2 is a diagram which illustrates an exemplary feedback control loop which may be tested using the apparatus of FIG. 1.

FIG. 2 illustrates an exemplary feedback control loop 200 in control system 110 (shown for reference) which may be tested using testing tool 100. Feedback control loop 200 includes a controller 202 and a plant 204, wherein plant 204 represents a device or system to be controlled by feedback control loop 200. In FIG. 2, s denotes the Laplace operator, $G_c(s)$ is the transfer function for the controller and $G_p(s)$ is the plant transfer function. R(s) is the input command or setpoint signal, Y(s) is the feedback signal which represents the variable being controlled, and E(s) is the error signal, which represents the difference between input command or setpoint signal R(s) and feedback signal Y(s). U(s) is the controller output, L(s) is a disturbance signal acting at the plant input, and V(s) is a disturbance signal acting on plant output. Preferably, feedback control loop 200 is designed so that error signal E(s) reaches zero at steady state. According to an exemplary embodiment, feedback control loop is a PI feedback control loop and the controller transfer function is given by:

$$G_c(s) = \frac{U(s)}{E(s)} = K_c\left(1 + \frac{1}{T_i s}\right) \quad (1)$$

where $K_c$ is the controller gain and $T_i$ is the integral time.

Referring again to FIG. 1, oscillation detection function 120 is configured to detect the presence of oscillations in control system 110, such as oscillations within feedback control loop 200 shown in FIG. 2. Oscillations are typically the result of periodic changes that cause a signal within feedback control loop 200 to vary in a deterministic and repeatable fashion. According to an exemplary embodiment, oscillation detection function 120 is configured to detect oscillations in feedback control loop 200 by detecting repeating patterns in error signal E(s). Error signal E(s) is acquired from feedback control loop 200 by, for example, directly measuring the difference between input command or setpoint signal R(s) and feedback signal Y(s), by estimating E(s) from another signal in feedback control loop 200, etc.

According to an exemplary embodiment, oscillation detection function 120 is configured to use autocorrelation information as a way to characterize properties of error signal E(s). The properties of error signal E(s) are then converted to system properties and an index is calculated that describes the stochastic control performance of feedback control loop 200. The index is preferably normalized between zero and one. Other exemplary oscillation detection functions are described in detail in co-pending U.S. application Ser. No. 10/844,663, filed May 13, 2004 entitled "Method of and System for Evaluating the Performance of a Control System," the entire contents of which are incorporated herein by reference.

Figure 3:
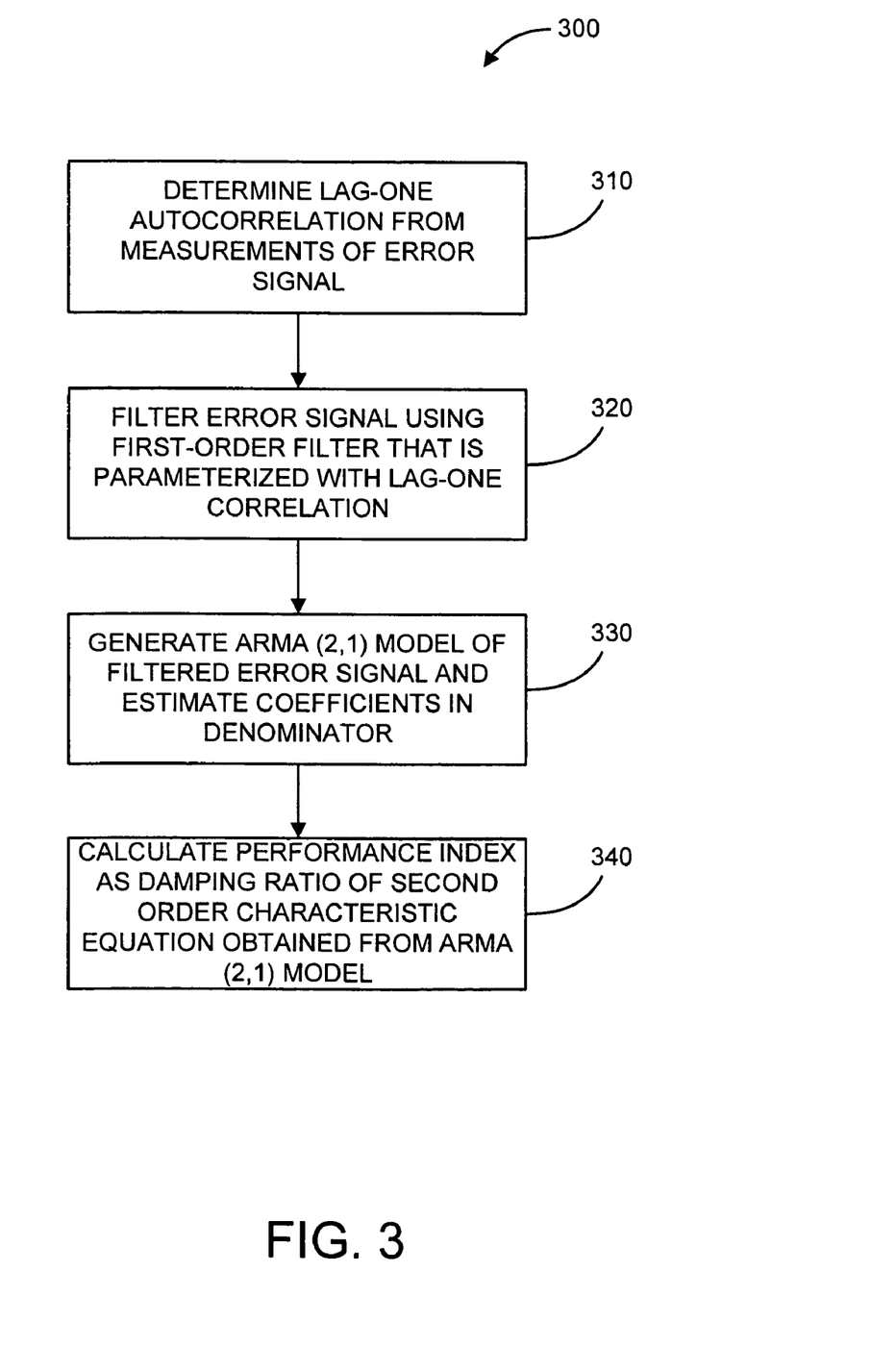
FIG. 3 is a flow diagram which illustrates a method of detecting oscillations according to an exemplary embodiment.

FIG. 3 illustrates a method 300 of detecting oscillations using a normalized index according to an exemplary embodiment. The method begins with a step 310. In step 310 the lag-one autocorrelation is determined from sample measurements (e.g., discrete, or digital samples) of error signal E(s) acquired from control system 110. The lag-one autocorrelation is determined from zero crossing information in the samples of error signal E(s) using the exemplary cosine formula:

$$\hat{\rho}_{e,1} = \cos(\pi \tilde{D}_1) \quad (2)$$

where $\tilde{D}_1$ is the average number of zero-crossings per sample of error signal E(s).

In a step 320, error signal E(s) is filtered using a first order filter that is parameterized with the lag-one autocorrelation from step 310. An exemplary first order filter is given by:

$$H(q^{-1}) = \frac{1}{1 - \hat{\rho}_{e,1} q^{-1}} \quad (3)$$

The filtered error signal is denoted by $e_{f,t}$, where $e_{f,t} = H(q^{-1})e_t$. The effect of the filtering operation is to add a new pole to the original process.

In a step 330, filtered error signal $e_{f,t}$ is modeled as a second-order autoregressive moving average (ARMA (2,1)) process, and the coefficients in the denominator $(1+w_1 q^{-1}+w_2 q^{-2})$ of the ARMA (2,1) model are estimated from the measurements of filtered error signal $e_{f,t}$. The coefficients may be estimated by solving the following two exemplary simultaneous equations:

$$w_1 = \frac{\hat{\rho}_1 \hat{\rho}_2 - \hat{\rho}_3}{\hat{\rho}_2 - \hat{\rho}_1^2} \quad (4)$$

$$w_2 = \frac{\hat{\rho}_1 \hat{\rho}_3 - \hat{\rho}_2^2}{\hat{\rho}_2 - \hat{\rho}_1^2} \quad (5)$$

In Eqs. (4) and (5), the autocorrelation lags $\hat{\rho}_1, \ldots \hat{\rho}_3$ can be estimated from a set of higher-order crossings using the following exemplary formulae:

$$\hat{\rho}_1 = \cos(\pi \tilde{D}_1)$$

$$\hat{\rho}_2 = -(2 - 2\hat{\rho}_1)\cos(\pi \tilde{D}_2) + (-1 + 2\hat{\rho}_1)$$

$$\hat{\rho}_3 = (6 - 8\hat{\rho}_1 + 2\hat{\rho}_2)\cos(\pi \tilde{D}_3) - (-4 + 7\hat{\rho}_1 - 4\hat{\rho}_2) \quad (6)$$

where $\tilde{D}_1, \tilde{D}_2, \tilde{D}_3$ are the first three higher-order crossings counts per sample in filtered error signal $e_{f,t}$. The set of higher-order crossings is obtained by counting crossing events in repeatedly differenced versions of filtered error signal $e_{f,t}$. For example, $\tilde{D}_2$ would be obtained by counting the number of zero crossings in the first difference of filtered error signal $e_{f,t}$ and dividing by the number of samples minus one.

In a step 340, he damping ratio $\zeta$ of the second-order characteristic equation for the ARMA (2,1) model obtained in step 330 is calculated and this damping ratio $\zeta$ is used as a control performance index η. To calculate damping ratio $\zeta$, the second-order characteristic equation is first transformed into the z-domain according to the following exemplary equation:

$$1 + w_1 q^{-1} + w_2 q^{-2} \Rightarrow W_q(z) = (z - r_1)(z - r_2) \quad (7)$$

where the roots $r_1$ and $r_2$ are obtained by solving the following quadratic equations:

$$r_1 = \frac{1}{2}\left(-w_1 + \sqrt{w_1^2 - 4w_2}\right), r_2 = \frac{1}{2}\left(-w_1 - \sqrt{w_1^2 - 4w_2}\right) \quad (8)$$

Given that poles at s=p in the s-plane map onto poles at $z=e^{p\Delta t}$ in the z-plane, expressions for damping ratio $\zeta$ and natural frequency $\omega_n$ of the second-order characteristic equation are derived from the phase and magnitude of $W_q(z)$ for the case when the roots are complex conjugates as given by:

$$\phi = \Delta t \omega_n \sqrt{(1-\zeta^2)} \quad (9)$$

$$M = \exp(-\Delta t \zeta \omega_n) = \exp\left(\frac{-\phi \zeta}{\sqrt{(1-\zeta^2)}}\right) \quad (10)$$

where $$\phi = \angle W_q(z) = \tan^{-1}\left(\frac{-1}{w_1}\sqrt{|w_1^2 - 4w_2|}\right)$$

is the phase and $$M = \|W_q(z)\| = \frac{1}{2}\sqrt{w_1^2 + |w_1^2 - 4w_2|}$$

is the magnitude of the complex conjugate roots, and $\Delta t$ is the sampled period.

Eqs (9) and (10) can be rearranged to provide the following expression for damping ratio $\zeta$ and thus control performance index $\eta$:

$$\eta = \frac{\pm \ln(M)}{\sqrt{\ln^2(M) + \phi^2}} \quad (11)$$

where control performance index $\eta$ is set to the positive root value. Real z-plane roots map onto real roots in the s-plane roots. Damping ratio $\zeta$ and thus control performance index $\eta$ of the second-order characteristic equation with two real roots can be calculated from:

$$\eta = -\frac{1}{2}\left[\frac{\ln(r_1) + \ln(r_2)}{\sqrt{\ln(r_1)\ln(r_2)}}\right] \quad (12)$$

Control performance index $\eta$ will be close to zero when error signal E(s) is oscillating. Oscillations are detected by checking when control performance index $\eta$ violates a threshold. For example, according to an exemplary embodiment, error signal E(s) is oscillating when $\eta < \delta$, where $\delta$ is a small number such as 0.1.

Thus, the method of and apparatus for evaluating the performance of a control system is configured to detect and diagnose oscillations without requiring any prior information about the feedback control loop being monitored, which facilitates easy implementation. Further, because the method and apparatus is capable of detecting and diagnosing oscillations based on a single signal from feedback control loop 200, it is applicable to a broad range of control systems, such as those with staged control, and also reduces the effort and cost required for implementation. The method of and apparatus for evaluating the performance of a control system also provides an intuitive index for detecting oscillations which is computationally simple and robust.

Referring again to FIG. 1, oscillation diagnosis function 130 is configured to diagnose the cause of oscillations present in control system 110, such as oscillations detected within feedback control loop 200 shown in FIG. 2 using, for example, oscillation detection function 120. More specifically, oscillation diagnosis function 130 is configured to distinguish between oscillations within feedback control loop 200 which are the result of control problems and oscillations within feedback control loop 200 which are the result of system problems. Control problems include such causes of oscillations as external oscillating disturbances to feedback control loop 200 and inadequate controller tuning (e.g., aggressive controller tuning) within feedback control loop 200. System problems include such causes of oscillations as static and dynamic nonlinearities of a device, a sticking valve, or insufficient valve actuator resolution in feedback control loop 200.

Oscillation diagnosis function 130 is configured to distinguish between oscillations caused by control problems and oscillations caused by system problems based on sample measurements of error signal E(s) in feedback control loop 200. Preferably, error signal E(s) is sampled at a rate sufficiently fast to capture key features of error signal E(s), such as curvatures, peaks, and zero crossings. It is also preferable to reduce the effects of noise by filtering error signal E(s) using a low-pass filter, such as a digital low-pass filter. An exemplary low pass filter has a filter coefficient selected as a function of a lag-one correlation function determined by oscillation detection function 120.

Figure 4:
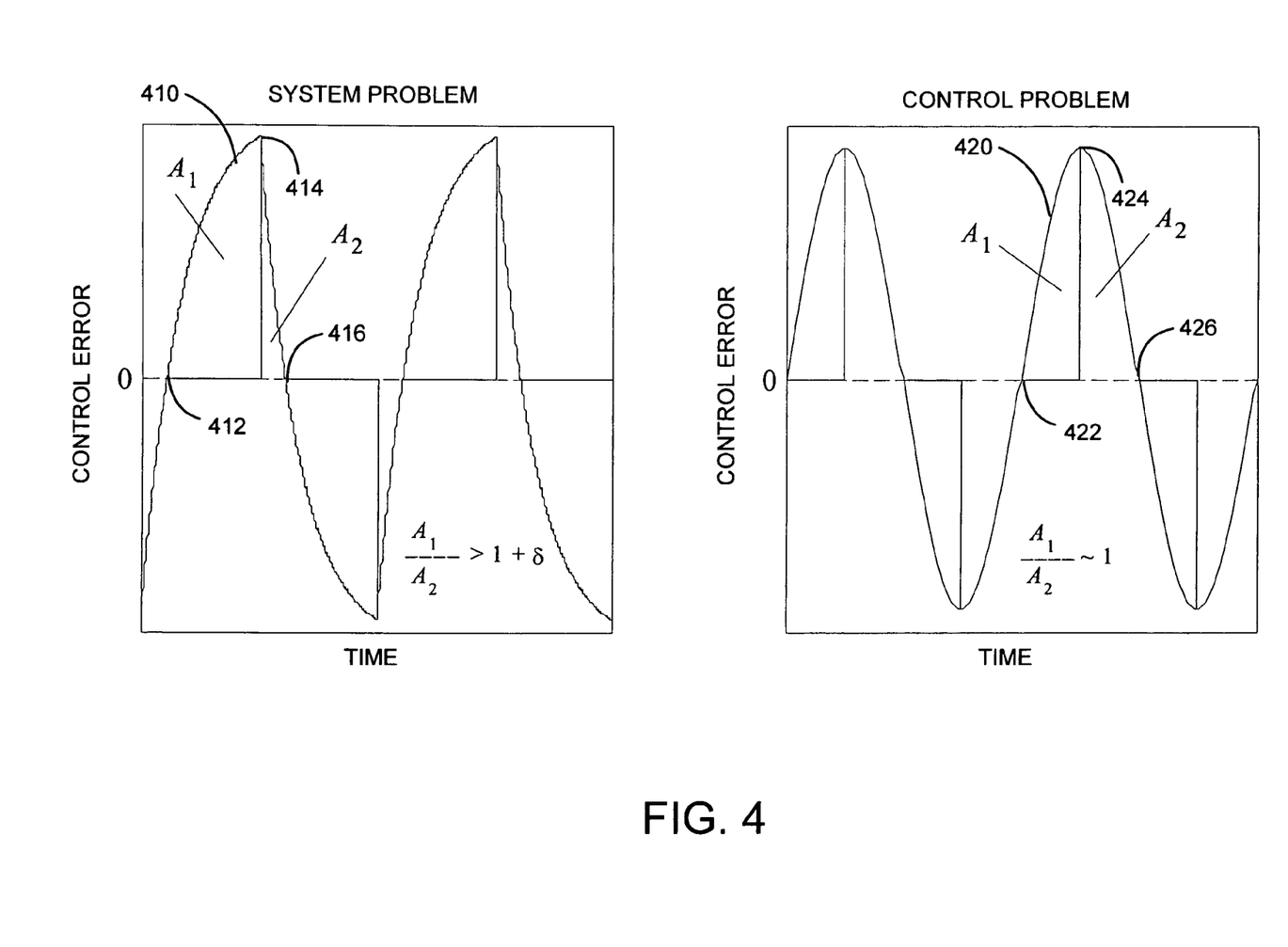
FIG. 4 graphically illustrates exemplary areas before and after peaks in an error signal for oscillations caused by system problems, and in an error signal for oscillations caused by control problems.

According to an exemplary embodiment, oscillation diagnosis function 130 is configured to distinguish between oscillations caused by control problems and oscillations caused by system problems by calculating the ratio of areas between zero crossings before and after a peak in error signal E(s). To illustrate, FIG. 4 graphically illustrates exemplary areas before and after peaks in an error signal E(s) 410 for oscillations caused by system problems, and in an error signal E(s) 420 for oscillations caused by control problems. For oscillations caused by system problems, such as a sticking valve, error signal E(s) 410 is typically characterized by a shape having exponential rise and decay. This exponential rise and decay is detected by calculating two areas associated with a half-cycle of a graphical representation of error signal E(s), and then calculating the ratio of the two areas to assess symmetry in error signal E(s). An area $A_1$ is defined between a zero crossing 412 and a peak 414 of error signal E(s), and an area $A_2$ is defined between peak 414 and a zero crossing 416. The ratio of $A_1$ and $A_2$ is given by:

$$R = A_1/A_2 \quad (13)$$

As area $A_1$ is typically larger than area $A_2$ for error signal E(s) 410, the ratio of $R = A_1/A_2$ is greater than one.

For oscillations caused by control problems, such as an aggressively tuned controller, the error signal E(s) 420 is typically sinusoidal in shape. This sinusoidal shape is similarly detected by calculating two areas associated with a half-cycle of a graphical representation of error signal E(s), and then calculating the ratio of the two areas to assess symmetry in error signal E(s). An area $A_1$ is defined between a zero crossing 422 and peak 424 of error signal E(s) 420 and an area $A_2$ is defined between peak 424 and a zero crossing 426. As area $A_1$ is typically equal to area $A_2$ for error signal E(s) 420, the ratio of $R=A_1/A_2$ is approximately one.

In order to distinguish between oscillations caused by control problems and oscillations caused by system problems, the ratio of $R=A_1/A_2$ is compared with a value of $1+\delta$, where $\delta$ is a tunable threshold value that determines the sensitivity of oscillation diagnosis function 130, and may be set to the desired value. Selecting a small value of $\delta$ results in high sensitivity and a larger probability of a false diagnosis, while selecting a larger value of $\delta$ results in reduced sensitivity and a smaller probability of a false diagnosis. According to an exemplary embodiment, a value of $\delta=1$ is used. It should be understood that $\delta$ as used in oscillation diagnosis function 130 is different from and independent of $\delta$ as used in oscillation detection function 120, and that the two values are not necessarily the same.

Figure 5:
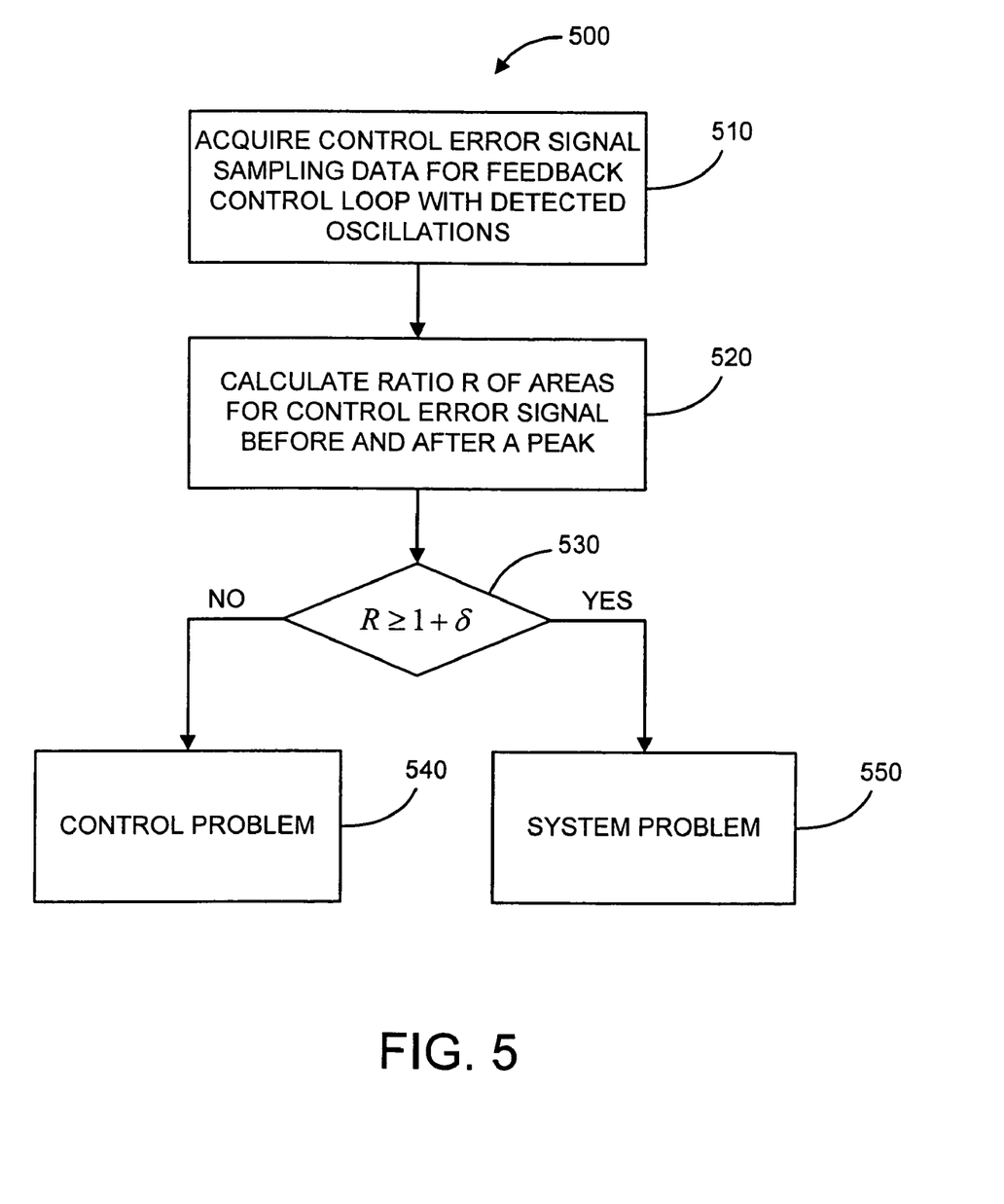
FIG. 5 is a flow diagram which illustrates a method of distinguishing between oscillations caused by control problems and oscillations caused by system problems according to an exemplary embodiment.

FIG. 5 illustrates a method 500 of distinguishing between oscillations caused by control problems and oscillations caused by system problems according to an exemplary embodiment. The method begins with a step 510. In step 510, sampling data for error signal E(s) is acquired for a feedback control loop in which oscillations have been detected. According to an exemplary embodiment, the oscillations are detected using oscillation detection function 120, and the samples of error signal E(s) are filtered using a digital low-pass filter having a coefficient selected as a function of the lag-one correlation function determined by oscillation detection function 120.

In a step 520, Eq. (13) is used to calculate a ratio R of two areas associated with error signal E(s) as described above with reference to FIG. 4. In a step 530, the calculated value of ratio R is compared with a quantity $1+\delta$, where $\delta$ is a threshold that determines the sensitivity of the diagnosis as described above. If the calculated value of R is equal to or greater than $1+\delta$, then a system problem, such as a sticking valve, is diagnosed as the cause of the oscillations in a step 540. If the calculated value of R is less than $1+\delta$ then a control problem, such as an aggressively tuned controller or an external disturbance, is diagnosed as the cause of the oscillations in a step 540.

Thus, the method of and system for evaluating the performance of a control system is capable of diagnosing oscillations using a single signal from a feedback control loop, which reduces the required effort and cost of implementation by not requiring multiple control signals to be monitored. The method and apparatus also simplifies diagnosis by providing an automated way to distinguish among different causes of oscillations that utilizes the calculation of a ratio of areas associated with a single control signal, and that does not require a visual inspection of various control signal waveforms. The method of and apparatus for evaluating the performance of a control system also provides an intuitive ratio value for distinguishing between possible causes of oscillations which is computationally simple and robust. The method of and apparatus for evaluating the performance of a control system is also easily implemented either directly or remotely, such that the proper diagnosis may be made before deciding whether it is necessary to dispatch service personnel to a remote site.

It should be understood that the construction and arrangement of the elements of the exemplary embodiments are illustrative only. Although only a few embodiments of the present invention have been described in detail in this disclosure, many modifications are possible without materially departing from the novel teachings and advantages of the subject matter recited in the claims. Accordingly, all such modifications are intended to be included within the scope of the present invention as defined in the appended claims. Unless specifically otherwise noted, the claims reciting a single particular element also encompass a plurality of such particular elements. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the exemplary embodiments without departing from the spirit of the present invention as expressed in the appended claims.

What is claimed is:

1. A method of evaluating the performance of a control system, the method comprising:
    acquiring an error signal associated with the control system;
    calculating a measure of symmetry of a half-cycle of the error signal;
    comparing the measure of symmetry with a predetermined value;
    determining a cause of an oscillation in the control system based on the comparison; and
    completing at least one of displaying the determined cause of the oscillation on an electronic display and storing the determined cause of the oscillation in a memory device.

2. The method of claim 1, wherein determining a cause of an oscillation in the control system includes distinguishing between a first cause and a second cause based on the comparison.

3. The method of claim 2, wherein the first cause is a system problem and the second cause is a control problem.

4. The method of claim 2, wherein distinguishing between the first cause and the second cause based on the comparison comprises selecting the first cause if the measure of symmetry is greater than or equal to the predetermined value, and selecting the second cause if the measure of symmetry is less than the predetermined value.

5. The method of claim 1,
    wherein the half-cycle comprises:
        (a) a first interval of the error signal between a first zero-crossing and a maximum or minimum of the error signal in the half-cycle, and
        (b) a second interval of the error signal between the maximum or minimum and a second zero crossing;
    wherein calculating a measure of symmetry of the half-cycle of the error signal comprises calculating a ratio between an integral of the error signal at the first interval, and an integral of the error signal at the second interval.

6. The method of claim 1, further comprising detecting an oscillation in the control system.

7. The method of claim 6, wherein detecting an oscillation in the control system comprises calculating a performance index value for the control system based on the signal.

8. The method of claim 1, wherein the error signal includes discrete data samples.

9. The method of claim 8, wherein acquiring the error signal from the control system comprises retrieving the discrete data samples from memory.

10. The method of claim 9, wherein acquiring the error signal includes filtering the signal with a digital low-pass filter.

11. The method of claim 1, wherein the control system is a heating, ventilating, and air conditioning system.

12. The method of claim 1, wherein the calculating, comparing, and determining steps are performed by a computerized device.

13. An apparatus for evaluating the performance of a control system, the apparatus comprising:
 a processor operable to execute a first function, wherein the first function is configured to perform the steps of:
 acquiring an error signal associated with the control system;
 calculating a measure of symmetry of a half-cycle of the error signal;
 comparing the measure of symmetry with a predetermined value;
 determining a cause of an oscillation in the control system based on the comparison; and
 causing at least one of displaying the determined cause of the oscillation on an electronic display and storing the determined cause of the oscillation in a memory device.

14. The apparatus of claim 13, wherein determining a cause of an oscillation in the control system includes distinguishing between a first cause and a second cause based on the comparison.

15. The apparatus of claim 14, wherein the first cause is a system problem and the second cause is a control problem.

16. The apparatus of claim 14, wherein distinguishing between the first cause and the second cause based on the comparison comprises selecting the first cause if the measure of symmetry is greater than or equal to the predetermined value, and selecting the second cause if the measure of symmetry is less than the predetermined value.

17. The apparatus of claim 13, wherein the half cycle comprises:
 (a) a first interval of the error signal between a first zero-crossing and a maximum or minimum of the error signal in the half-cycle, and
 (b) a second interval of the error signal between the maximum or minimum and a second zero crossing;
 wherein calculating a measure of symmetry of the half-cycle of the error signal comprises calculating a ratio between an integral of the error signal at the first interval, and an integral of the error signal at the second interval.

18. The apparatus of claim 13, wherein the processor is further operable to execute a second function configured to perform the step of detecting an oscillation in the control system.

19. The apparatus of claim 18, wherein detecting an oscillation in the control system comprises calculating a performance index value for the control system based on the signal.

20. The apparatus of claim 13, wherein the error signal includes discrete data samples.

21. The apparatus of claim 13, wherein the processor acquires the error signal by communicating with means for acquiring the error signal from the control system.

22. The apparatus of claim 21, wherein the means for acquiring the error signal is configured to filter the signal with a digital low-pass filter.

23. The apparatus of claim 13, wherein the control system is a heating, ventilating, and air conditioning system.

24. An apparatus for evaluating the performance of a control system, the apparatus comprising:
 means for acquiring an error signal associated with the control system;
 means for calculating a measure of symmetry of a half-cycle of the error signal;
 means for comparing the measure of symmetry with a predetermined value;
 means for determining a cause of an oscillation in the control system based on the comparison; and
 means for causing at least one of displaying the determined cause of the oscillation on an electronic display and storing the determined cause of the oscillation in a memory device.

25. The apparatus of claim 24, wherein determining a cause of an oscillation in the control system includes distinguishing between a first cause and a second cause based on the comparison.

26. The apparatus of claim 25, wherein the first cause is a system problem and the second cause is a control problem.

27. The apparatus of claim 25, wherein distinguishing between the first cause and the second cause based on the comparison comprises selecting the first cause if the measure of symmetry is greater than or equal to the predetermined value, and selecting the second cause if the measure of symmetry is less than the predetermined value.

28. The apparatus of claim 24,
 wherein the half-cycle comprises:
 (a) a first interval of the error signal between a first zero-crossing and a maximum or minimum of the error signal in the half-cycle, and
 (b) a second interval of the error signal between the maximum or minimum and a second zero crossing;
 wherein the means for calculating a measure of symmetry of the half-cycle of the error signal calculates a ratio between an integral of the error signal at the first interval, and an integral of the error signal at the second interval.

29. The apparatus of claim 24, further comprising means for detecting an oscillation in the control system.

30. The apparatus of claim 29, wherein detecting an oscillation in the control system comprises calculating a performance index value for the control system based on the signal.

31. The apparatus of claim 24, wherein the error signal includes discrete data samples.

32. The apparatus of claim 24, further comprising a digital low-pass filter configured to filter the error signal.

33. The apparatus of claim 24, wherein the control system is a heating, ventilating, and air conditioning system.

34. A method of evaluating the performance of a control system, the method comprising:
 detecting an oscillation in the control system;
 acquiring an error signal relating to the oscillation;
 calculating a measure of symmetry of a half-cycle of the error signal;
 comparing the measure of symmetry with a predetermined value;
 determining a cause of an oscillation in the control system based on the comparison; and
 completing at least one of displaying the determined cause of the oscillation on an electronic display and storing the determined cause of the oscillation in a memory device.

35. An apparatus for evaluating the performance of a control system by monitoring an error signal for the control system, the apparatus comprising:
 a processor operable to execute a first function and a second function, wherein the first function is configured to perform the steps of:
 calculating a measure of symmetry of a half-cycle of the error signal;
 comparing the measure of symmetry with a predetermined value;
 determining a cause of an oscillation in the control system based on the comparison; and wherein the second function is configured to perform the step of detecting an oscillation in the control system; and
 completing at least one of displaying the determined cause of the oscillation on an electronic display and storing the determined cause of the oscillation in a memory device.

* * * * *